United States Patent (10) Patent No.: US 10,081,127 B2
Baumgarte et al. (45) Date of Patent: Sep. 25, 2018

(54) HEATING DEVICE FOR A BLOW-MOLDING MACHINE WITH A CONVEYING CHAIN FOR TWO-ROW TRANSPORT OF THE PREFORMS

(71) Applicant: KHS Corpoplast GbmH, Hamburg (DE)

(72) Inventors: Rolf Baumgarte, Ahrensburg (DE); Frank Lewin, Tangstedt (DE); Michael Linke, Hamburg (DE); Deniz Ulutürk, Hamburg (DE); Daniel Firchau, Mölln (DE); Julian Choinski, Hamburg (DE)

(73) Assignee: KHS Corpoplast GmbH, Hamburg (DE)

( * ) Notice: Subject to any disclaimer, the term of this patent is extended or adjusted under 35 U.S.C. 154(b) by 0 days.

(21) Appl. No.: 15/657,723

(22) Filed: Jul. 24, 2017

(65) Prior Publication Data

US 2018/0029283 A1 Feb. 1, 2018

(30) Foreign Application Priority Data

Jul. 27, 2016 (DE) .................... 10 2016 113 875

(51) Int. Cl.
*B29C 49/42* (2006.01)
*B29C 49/64* (2006.01)
(Continued)

(52) U.S. Cl.
CPC ...... *B29C 49/6409* (2013.01); *B29C 49/4205* (2013.01); *B29C 49/4215* (2013.01);
(Continued)

(58) Field of Classification Search
CPC ............ B29C 49/6409; B29C 49/4205; B29C 49/4215
See application file for complete search history.

(56) References Cited

U.S. PATENT DOCUMENTS

| 2,487,354 A | 11/1949 | McNamara et al. |
| 4,076,071 A | 2/1978 | Rosenkranz et al. |
| 5,346,386 A | 9/1994 | Albrecht et al. |
| 5,648,026 A | 7/1997 | Weiss |

(Continued)

FOREIGN PATENT DOCUMENTS

| DE | 19906309 A1 | 8/2000 |
| DE | 19906438 A1 | 8/2000 |

(Continued)

*Primary Examiner* — Robert B Davis
(74) *Attorney, Agent, or Firm* — Rankin, Hill & Clark LLP

(57) ABSTRACT

The invention relates to a heating apparatus (H) having at least one heating line (24) for the thermal conditioning of preforms (1) made of thermoplastic material to a temperature profile which is suitable for blow shaping, wherein the heating apparatus (H) comprises a transport device for transporting the preforms (1) along a transport path (T) of the heating apparatus (H), said transport device comprising a revolving conveyor chain (F) having a plurality of pivotably interconnected chain links (33), and wherein the transport device comprises handling means (39) for holding and manipulating a single preform (1) each, wherein the transport device is embodied and configured such that the preforms (1) are guided in a single row in at least a first section of the transport path (T), and are guided in two adjacent rows in at least a second section of the transport path (T), and wherein each chain link (33) comprises a bracket (41) on which a first handling means (39) and a second handling means (39') are arranged, and wherein the bracket (41) comprises a main arm (42) and a pivot arm (43), pivotably connected to the main arm (42), and wherein a change between a single-row transport of the preforms (1) and a double-row transport is enabled by pivoting the pivot arm (43).

10 Claims, 7 Drawing Sheets

Figure 1:
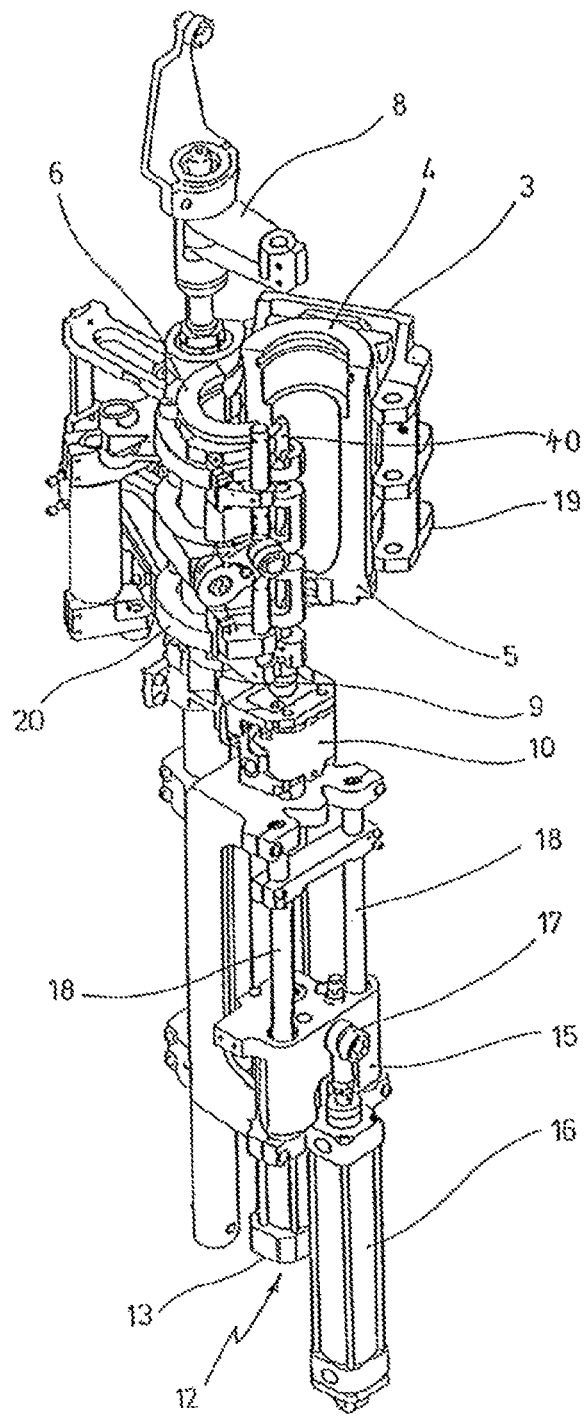

(51) Int. Cl.
  *B29K 667/00* (2006.01)
  *B29L 31/00* (2006.01)
  *B29K 23/00* (2006.01)
  *B29K 67/00* (2006.01)
  *B29C 49/06* (2006.01)
  *B29C 49/12* (2006.01)
  *B29C 49/36* (2006.01)

(52) U.S. Cl.
  CPC ............. *B29C 49/06* (2013.01); *B29C 49/12* (2013.01); *B29C 49/36* (2013.01); *B29K 2023/12* (2013.01); *B29K 2067/003* (2013.01); *B29K 2623/12* (2013.01); *B29K 2667/00* (2013.01); *B29K 2667/003* (2013.01); *B29L 2031/712* (2013.01); *B29L 2031/7158* (2013.01)

(56) References Cited

U.S. PATENT DOCUMENTS

| | | | |
|---|---|---|---|
| 7,810,629 B2 * | 10/2010 | Kronseder | B65G 17/385 198/347.1 |
| 2004/0047941 A1 | 3/2004 | Salenbien et al. | |
| 2008/0310941 A1 | 12/2008 | Freire-Diaz et al. | |
| 2010/0068329 A1 | 3/2010 | Lo et al. | |
| 2013/0192956 A1 | 8/2013 | Lahogue et al. | |
| 2016/0318215 A1 | 11/2016 | Lewin et al. | |

FOREIGN PATENT DOCUMENTS

| | | |
|---|---|---|
| DE | 102010064545 A1 | 1/2014 |
| DE | 102014017546 A1 | 6/2016 |
| DE | 102016001630 A1 | 8/2017 |
| FR | 2736583 A1 | 1/1997 |

\* cited by examiner

HEATING DEVICE FOR A BLOW-MOLDING MACHINE WITH A CONVEYING CHAIN FOR TWO-ROW TRANSPORT OF THE PREFORMS

The invention relates to a heating apparatus for the thermal conditioning of preforms that are provided for blow molding, and to a blow-molding machine.

In the process of molding containers by the application of blow pressure, preforms made of a thermoplastic material, for example preforms made of PET (polyethylene terephthalate), are fed to various processing stations within a blow-molding machine, that is to say within an apparatus for producing finished containers from preforms by means of blow shaping. Typically, such a blow-shaping machine or blow-molding machine comprises a heating apparatus and a blowing device, in the zone of which the preform, which has been temperature-treated in the heating apparatus, is expanded by biaxial orientation to form a container. Expansion is induced by means of compressed air, for example, which is introduced into the preform element to be expanded. The process sequence for such an expansion of the preform is described, for example, in patent number DE 43 40291 A1.

The introduction of the pressurized gas involves introducing compressed gas into the developing container bubble as well as introducing compressed gas into the preform at the start of the blow-shaping process or blow-molding process. Other fluids may also be used for blow molding, more particularly, the filling material to be filled into the container may be used. Although the following general description is based on the example of a blow-molding machine that uses compressed gas, the invention is not restricted specifically to such blow-molding machines.

The basic construction of a blow mold station for molding containers is described, for example, in patent number DE 42 12 583 A1. Possible methods for thermally conditioning the preforms are explained in DE 23 52 926 A1. Explicit reference is made to the aforementioned documents, and therefore a more detailed description of blow mold stations and thermal conditioning is unnecessary.

The preforms and the blow molded containers can be transported within the blow-molding apparatus by means of various transporting and handling devices. It is known, for example, to use transport mandrels on which the preforms are held for transport. However, preforms may also be handled and transported by means of other supporting devices. The use of gripping tongs for handling and for transporting preforms, and the use of clamping mandrels, which can be inserted into the mouth area of the preform for the purpose of holding it, are also among the available constructions.

The transporting and handling of containers and preforms using transfer wheels is described, for example, in DE 199 06 438 A1, in an arrangement that includes one transfer wheel between a blow wheel and an output line and another transfer wheel between the heating line and the blow wheel.

The handling of the preforms described above takes place in so-called two-stage methods, in which the preforms are initially manufactured in an injection molding process, then are placed in intermediate storage, and are only later thermally conditioned and blown into a container. Such handling also takes place in so-called single-stage methods, however, in which the preforms are temperature treated immediately after being manufactured by means of injection molding technology and once they are sufficiently solidified, after which they are blow molded.

With regard to the blow mold stations that are used, various embodiments are known. In blow mold stations that are arranged on rotating transport wheels, more specifically on a so-called blow wheel, a book-like opening of the mold carrier is frequently found. It is also possible, however, to use mold carriers that are displaceable relative to one another or are guided in some other way. In stationary blow mold stations, which are suitable, in particular, for receiving multiple cavities for container forming, plates arranged parallel to one another are typically used as mold carriers.

Before heating is carried out, the preforms are typically placed onto transport mandrels which either transport the preform through the entire blow-molding machine, or merely revolve in the area of the heating apparatus. If the preforms are heated in an upright position, such that the mouths of the preforms are oriented downward in the vertical direction, the preforms are typically placed on a sleeve-shaped holding element of the transport mandrel. If the preforms are heated in a hanging position, in which the mouths of the preforms are oriented upward in the vertical direction, spreading mandrels are typically inserted into the mouths of the preforms and clamp the preforms tightly. Both active controllable and passive clamping elements are known from the prior art. Passive clamping elements produce a clamping action, for example, as a result of an exerted spring force, against which the preforms are placed onto the transport mandrels or against which the preforms are removed from the transport mandrel, whereas active transport mandrels must be actuated, for example by an actuator or, for example, by an external cam control mechanism, which triggers the clamping mechanism or releases the clamping engagement.

To reduce the amount of heating time required, it is known to use NIR radiators in the area of the heating line, which emit heating radiation in a near infrared range, typically with wavelengths of between 0.4 and 1 micrometer. The preforms are heated primarily by radiation absorption as the NIR radiation passes through the preform material. To optimize the energy yield, such heating lines are equipped with a plurality of reflective surfaces in order to avoid as much as possible, or at least significantly reduce, the absorption of the heat radiation by components of the heating line, and to reflect the NIR radiation back onto the preform for heating.

The heating lines are typically configured as at least partially tunnel-like. In such cases, the heating lines are bounded, for example, on one side by the housing, which has a support for the heating elements, and on the opposite side by a reflector positioned opposite said housing, also known as a counter reflector. In the vertical direction, a boundary may be formed by a base and/or by a cover, depending on whether the preforms are transported through the heating line with their mouths oriented upward or downward in the vertical direction. These vertical boundaries may also be embodied as reflectors. It is also routine to protect the mouth area of the preform against heating radiation by using reflectors that are carried along with the preform, also referred to as mouth reflectors, since this area is already finished during manufacturing and will not be further deformed during blow molding.

The process of heating and developing a defined temperature profile is a critical process step in preparing the preforms for blow shaping into containers. Essential process parameters for the biaxial expansion of the preform carried out in the blow mold station are determined based on the temperature profile that is established in the wall material of the preform during the heating process. For example, the temperature profile determines the maximum speed of a stretching rod inserted into the preform and the maximum expansion rate of the container bubble during the application of pressure to the preform. Higher speeds lead to higher throughput rates and thus to increased efficiency of the blow-molding machine.

A high throughput of preforms through the blow-molding machine requires an increased throughput of preforms during their transport through the heating apparatus disposed upstream. This results in an increased amount of energy required for heating the preforms. To heat the preforms, electrical energy is typically converted into thermal energy, which is then typically applied to the preforms via radiation. Increased throughput rates through the blow-molding machine and through the heating apparatus result not only in an increased amount of energy required for the heating process, but also in increased energy losses caused by the individual process steps. Losses of thermal energy result, for example, from the absorption of thermal radiation by structural components of the heating apparatus, or from radiation losses through technically based openings in the heating apparatus that lead to the environment. For financial reasons and to conserve existing resources, there is a constant desire to minimize energy losses.

Significant heat losses in the area of the heating apparatus occur, in particular, as a result of thermal radiation escaping in the area of the heating line through gaps between the preforms carried on the transport mandrels. This problem is typically solved by using mouth reflectors in the form of apertured shields, with which the gaps can be partially closed. Typically, the mouth area of the preform is located on the shaded side of the apertured shield and the preform body is located on the irradiated side of the apertured shield. As the preform is transported through the heating apparatus, the preform body is heated up, and the mouth area is protected from overheating by the apertured shield. The preforms can be passed through the openings in the apertured shields, and can be held in a position immersed in the apertured shield as they are transported along the heating line. Solutions of this type are known, for example, from DE 10 2010 064 545 A1 and DE 10 2015 005 358 A1.

As the preforms are transported through a heating apparatus of a blow-molding machine, particular efforts are focused on achieving the necessary temperature profile with a high efficiency of the heating elements and with the highest possible throughput rates. The configuration and the functioning principle of the transport system that is used for manipulating and holding the preforms as they are guided along a transport path through the heating apparatus play a central role in this.

The object of the present invention is to provide a heating apparatus of the type mentioned at the outset, having an improved transport system which, at high throughput rates, supports energy-efficient heating of the preforms.

This object is achieved by a heating apparatus having at least one heating line for thermally conditioning preforms made of thermoplastic material to a temperature profile suitable for blow molding, wherein the heating apparatus comprises a transport device for transporting the preforms along a transport path of the heating apparatus, wherein the transport device comprises a revolving conveyor chain having a plurality of pivotably interconnected chain links, wherein the transport device comprises a first handling means and a second handling means, wherein the first handling means and the second handling means are each configured to hold and manipulate a single preform, wherein the transport device is configured such that the preforms are guided in a single row in at least a first section of the transport path and are guided in two adjacent rows in at least a second section of the transport path, wherein each of the pivotably interconnected chain links comprises a bracket on which the first handling means and the second handling means are arranged, and wherein the bracket comprises a main arm and a pivot arm that is pivotably connected to the main arm such that a change between guidance of the preforms in the single row in at least the first section of the transport path and guidance of the performs in the two adjacent rows in at least a second section of the transport path is effectuatable by pivoting the pivot arm. Advantageous embodiments are specified in the dependent claims.

According to the invention, a heating apparatus having at least one heating line for the thermal conditioning of preforms made of thermoplastic material to a temperature profile that is suitable for blow shaping is provided, in which the heating apparatus comprises a transport device for transporting the preforms along a transport path of the heating apparatus, the transport device including a revolving conveyor chain which has a plurality of pivotably interconnected chain links, and the transport device also including handling means for holding and manipulating a single preform each; the transport device is embodied and configured such that the preforms are guided in a single row in at least a first section of the transport path and are guided in two mutually adjacent rows in at least a second section of the transport path; each chain link includes a bracket on which a first handling means and a second handling means are arranged, and the bracket comprises a main arm and a pivot arm which is connected pivotably to the main arm; the system can be switched between a single-row transport of the preforms and a double-row transport by pivoting the pivot arm.

It is an advantage of a multi-row transport of preforms that the space that is available in the heating apparatus can be optimally utilized. In contrast to the conventional single-row guidance of preforms, multi-row transport allows the space that is located radially on the inside toward the circular path of the transport line to be used for guiding an additional row of preforms, which enables a compact design of the heating apparatus and a short length of the heating paths.

One challenge of multi-row transport is that, in order to handle preforms that are guided in multiple rows, particularly in the infeed and output areas of the heating apparatus, where the preforms are received into the transport device or are released therefrom, special receiving or releasing devices that can reach the preforms that are guided on the outer path as well as those that are guided on the inner path are required. This increases the complexity and the susceptibility to malfunction of the transport and handling devices that are used. It is therefore an important aspect of the invention that the preforms can be converted from multi-row guidance to single-row guidance as they are being transported through the heating apparatus.

In the area where the preforms are guided in a single row, that is, in a first section of the transport path, manipulating devices are able to engage laterally into the transport flow of preforms for the purpose of transferring preforms into the transport device or removing them from the transport device. Such manipulating devices may be gripping elements mounted on transfer wheels, for example.

Single-row transport also offers advantages over double-row transport when inspection means for inspecting the preforms are provided along the transport path. A scanning area of an inspection device that scans the preforms laterally can be directed toward a single transport row. In the single-row transport area, all the preforms can be scanned by placing an inspection device on only one side of the transport flow.

The invention combines the advantages of single-row and multi-row transport because it provides for a transition from single-row to multi-row transport, and vice versa.

During single-row guidance, the preforms are moved in the transport flow one after the other in the transport direction. During multi-row guidance, that is, when the preforms are guided one after the other in the direction of transport in adjacent rows, the preforms can be guided in parallel transport rows, more particularly in two parallel transport rows.

Multi-row transport of the preforms is advantageous in the area of a heating line in particular, because it allows the preforms to be guided in a plurality of heating alleys arranged side by side. To this effect, it is provided that at least one of the heating lines is located in one of the second sections. It is also possible for a first heating line having at least two heating alleys and a second heating line having just one heating alley to be located in the heating apparatus. This combination of different heating lines allows the thermal conditioning of the preforms to be adjusted particularly effectively.

Heating lines that have a plurality of heating alleys arranged side by side can be significantly shorter in terms of their longitudinal extension than heating lines with single alleys, since considerably more preforms travel through the heating area of a multi-alley heating line than travel through heating lines that have a single alley. This enables the efficiency of the heating lines, and thus the energy efficiency, to be significantly improved.

In a preferred embodiment, it has been provided that the heating line comprises at least one heating device having two heating alleys extending in parallel in the direction of transport of the preforms, with each heating alley being assigned to one of the two mutually adjacent rows of preforms, with the heating device having radiant heaters for thermally conditioning the preforms, and with the radiant heaters being arranged, in particular, between the two heating alleys.

Further preferably, it has been provided that the heating apparatus has at least two heating lines, spaced from one another along the transport path, in particular with one of the first sections of the transport path being formed between the two heating lines.

Using at least two heating lines that are spaced from one another along the transport path allows the preforms to be thermally conditioned in an efficient and process-flexible manner, with high throughput rates. The turning areas and/or transfer areas for receiving and/or releasing the preforms, for example, may be located in the areas between the heating lines.

It can be provided that the heating apparatus comprises a first transfer area for receiving preforms, one preform for each handling means, and a second transfer area for releasing the preforms from the handling means, with the first transfer area and/or the second transfer area being located in one of the first sections. The transfer areas are thus preferably located in the first section, that is, in the single-row guidance area. The receiving of preforms can be understood as the start of the transport path traveled by a preform as it passes through the heating apparatus. Accordingly, the releasing of the preforms can be understood as the end of the transport path.

With a single-row guidance of the preforms in the area of loading or unloading, a low transport density with greater spacing between the transported preforms can be utilized to advantage for the collision-free loading or unloading of the transport device with preforms.

Regarding the arrangement of the handling means, it can be provided, for example, that the first and the second handling means are secured on the pivot arm. When the pivot arm is pivoted about a pivot joint on the main arm, the preforms that are supported on the handling means can be pivoted into a single-row or double-row guidance in the direction of transport.

In a preferred embodiment, it is provided that the first handling means of a bracket is secured to the main arm and that the second handling means is secured to the pivot arm, spaced from the rotational axis of the pivot joint that connects the main arm to the pivot arm.

In one embodiment, it is provided that the main arms can be pivoted between a closed position in a rectilinear guidance area of the chain links and a splayed position in a curved guidance area of the chain links. In this case, it can be provided that the pivot arms are pivotable between a turned-out position for the double-row guidance of the preforms and a turned-in position for the single-row guidance of the preforms. When the bracket is moved, it is provided that the pivot arms pivot into the turned-out position as soon as the associated main arms pivot from the splayed position into the closed position. It is further provided that the pivot arms pivot into the turned-in position as soon as the associated main arms pivot from the closed position into the splayed position.

The brackets can be arranged such that in the closed position, the main arms are moved to lie bearing against one another. In the splayed position, an open space is created between the main arms, into which the pivot arm can pivot in order to reach a turned-in position. The main arms are preferably pivoted into the splayed position in a curved guidance area of the chain links, which the chain links preferably traverse in the turning area of the conveyor chain.

Some structural details of a heating apparatus according to the invention, in particular details on the configuration of transport and handling means according to the invention, may be embodied as described in DE 10 2015 005 358.2 and DE 10 2014 017 546.4. These documents are therefore expressly incorporated by reference.

For a particularly advantageous implementation of the pivoting mechanism of the bracket that will permit a simplified guidance of the preforms, it is provided that the first handling means is positioned on the bracket coaxially to the rotational axis of the pivot joint that connects the main arm to the pivot arm.

It can preferably be provided that each of the handling means comprises a holding mandrel mounted displaceably transversely to the direction of transport, the holding mandrel comprising a holding head that engages into the mouth area of a preform. A holding head that engages into the mouth area enables, in particular, the hanging transport of the preforms along the transport path.

For the development, in particular, of a homogeneous temperature profile, or a temperature profile that is adapted specifically to the shape of the container to be produced, it can be provided that the first and/or the second handling means each include a coupling element for the rotation of a preform that is secured to the handling means, in which case a rotary drive mechanism that cooperates with the coupling elements is provided in the area of at least one of the heating lines.

The coupling element may be a ring gear on a handling means, for example, which can be brought into meshing engagement with a rotary drive mechanism positioned laterally on the holding mandrel, and embodied as a toothed chain, for example. The holding mandrel can be set in rotation by a relative movement between the toothed chain and the ring gear. By means of the rotary drive, the preforms can be rotated about their longitudinal axis, thereby ensuring uniform thermal radiation on all sides by means of heating elements arranged on the sides of the preforms in the heating line.

To simplify the construction of the rotary drive, it may be provided that only one handling means of a bracket is actively driven by a rotary drive mechanism, and the rotational movement is then transmitted to another handling means. In particular, it is conceivable for the second or the first handling means that includes the coupling element to be movably coupled to the first or the second handling means of a bracket in such a way that the rotation of the second handling means induced by the rotary drive mechanism is transmitted to the first handling means, or the rotation of the first handling means induced by the rotary drive mechanism is transmitted to the second handling means.

The rotational movement may be transmitted, for example, by means of a belt or a chain that rotatably connects the handling means. A rotary drive mechanism located outside of the conveyor chain can thus be positioned on one side of the preform rows, and can place those guided on the inside and those guided on the outside in rotation. Alternatively or additionally, a rotary drive mechanism may be provided on both sides of the preform rows.

For the guided pivoting of the pivot arms, it is provided that the transport device comprises guide means for the controlled guidance of the pivot arms.

In particular, it can be provided that the guide means comprise a guide rail arranged fixed in the area of the heating apparatus, and guide elements that are arranged on the brackets and cooperate with the guide rail as the chain links revolve. Guide elements such as guide pins or guide rollers can be arranged on the bracket, in particular on the pivot arm, and bear against the guide rail as the conveyor chain revolves, thereby forcing the pivot arm, in particular, into a specified movement path. Guide rails arranged fixedly in relation to the conveyor chain can serve exclusively or supplementarily to move the pivot arms by controlled guidance into a turned-out position for double-row transport of the preforms or into a turned-in position for the single-row transport of the preforms.

A guide roller for pivotably guiding the pivot arm can be arranged on the pivot arm, with its rotational axis coaxially, in particular, to the second handling means. Said guide roller is supported against the guide rail during revolution of the conveyor chain, so that the pivot arm is prevented from exceeding a pivot angle that is determined by the position and the profile of the guide rail.

In a preferred embodiment, it is provided that the guide means comprise coupling rods, each of which pivotably connects a pivot arm, which is mounted pivotably on a main arm, to a bracket which is adjacent thereto in the direction of revolution of the conveyor chain. The coupling rods preferably connect a pivot arm to the bracket that follows it downstream in the direction of revolution of the conveyor chain, in particular to the main arm downstream. To articulate the coupling rod to the elements of two brackets, which elements are connected by the coupling rod, it is preferably provided that, on the one hand, the rotational axis of the coupling rod is arranged on the pivot arm coaxially to the rotational axis of the second handling means and, on the other hand, the rotational axis of the coupling rod is arranged on the adjacent bracket, coaxially to the rotational axis of the first handling means.

Such coupling rods are preferably provided as tension- and/or pressure-resistant connecting elements between the pivot arm and an adjacent bracket, which enables the transmission of tensile and/or compressive forces between the elements of two brackets, which elements are connected by the coupling rod, and increases the mechanical stability of the conveyor chain.

To prevent malfunctions of the conveyor chain in order to avoid extreme rotary bearing loads, it can be provided that the guide means are embodied and configured to prevent the connection formed by the pivot arm and the coupling rod from reaching an over dead center position.

In particular, it can be provided that the rotational axis of the pivot joint that connects the pivot arm to the coupling rod is prevented from pivoting beyond the imaginary connecting line between the rotational axis of the pivot joint that connects the main arm to the pivot arm and the rotational axis of the pivot joint that connects the coupling rod to the adjacent main arm. In a preferred turned-out position of the pivot arm, in which the preforms are transported in two rows, the pivot arm is pivoted outward in relation to the revolution of the conveyor chain. The protection against reaching the over dead center position thus prevents, in particular, any pivoting inward beyond the connecting line of the pivot joints.

The prevention of an over dead center position is helpful, in particular, when coupling rods are used for which the rotational axis of the pivot joint that connects the coupling rod to the adjacent bracket is positioned coaxially to the rotational axis of the pivot joint between the main arm and the pivot arm of said bracket which is articulated to said main arm. In such cases, when the pivot arm is pivoted inward, the dead center position can be unintentionally exceeded, which in certain circumstances can result in high bearing loads and excessive material wear.

When fixedly positioned guide rails are used, it is conceivable, in particular, that one or more guide rails might force a guidance of the pivot arms both inwardly and outwardly with respect to the circulation of the conveyor chain, which could render the use of coupling rods between a pivot arm and an adjacent bracket superfluous. Such guide rails can also be used in place of or in addition to the use of coupling rods. A supplementary use of guide rails may be useful for relieving the load on the pivot bearings of the pivotable elements of the brackets.

To increase the energy efficiency of the heating apparatus, it can be provided that the transport device comprises radiation shields, which are supported by the conveyor chain in such a way that they are positioned between two handling means, at least in at least one of the heating lines, in particular a heating line within a second section of the transport path.

In this embodiment it is provided, in particular, that at least one radiation shield is positioned on each of at least a number of pivot arms, blocking, at least in some areas, the vertical passage between two preforms transported in a row, one behind the other, during double-row or multi-row transport of the preforms.

In particular, it is provided that the radiation shields block the vertical passage between two handling means, below a mouth section of the preforms, so that thermal radiation acting on the preforms below the mouth sections is prevented from escaping in the direction of the mouth section.

Structural details and advantages of such mouth reflectors configured as radiation shields can also be found in document number DE 10 2016 001 630, to which express reference is therefore made.

In one conceivable embodiment, it can be provided that the radiation shields are each mounted movably on the pivot arms of a conveyor chain. More particularly, it can be provided that the radiation shields are mounted rotatably on the pivot arms, the rotational axis of the radiation shields preferably extending parallel to the pivot axis of the pivot arms.

A movable mounting of the radiation shields on the pivot arms of a conveyor chain allows the movement of the radiation shield to be controlled independently of the pivoting movement of the conveyor chain, thereby promoting the compact structure of the chain links. As a result, the radiation shield can be brought particularly close to the preforms or moved far away from the preforms, which in the closed position results in a particularly effective covering of the intermediate space between the transported preforms, and in the splayed position leaves ample space for the collision-free manipulation of the preform.

Alternatively, it can be provided that the radiation shields are attached immovably to the pivot arms. An immovable arrangement of the radiation shields can be embodied as more robust and less susceptible to malfunction than a mechanical structure involving movably arranged radiation shields.

Also provided according to the invention is a blow-molding machine comprising a heating apparatus according to the invention, which has at least one heating line for the thermal conditioning of preforms made of thermoplastic material to a temperature profile that is suitable for blow shaping, and comprising a blow-shaping apparatus for biaxially blow shaping the preform into a container. Embodiments, details and advantages of the blow-molding machine according to the invention will also be apparent, for example, from the explanations and exemplary embodiments of the heating apparatus according to the invention.

Figure 2:
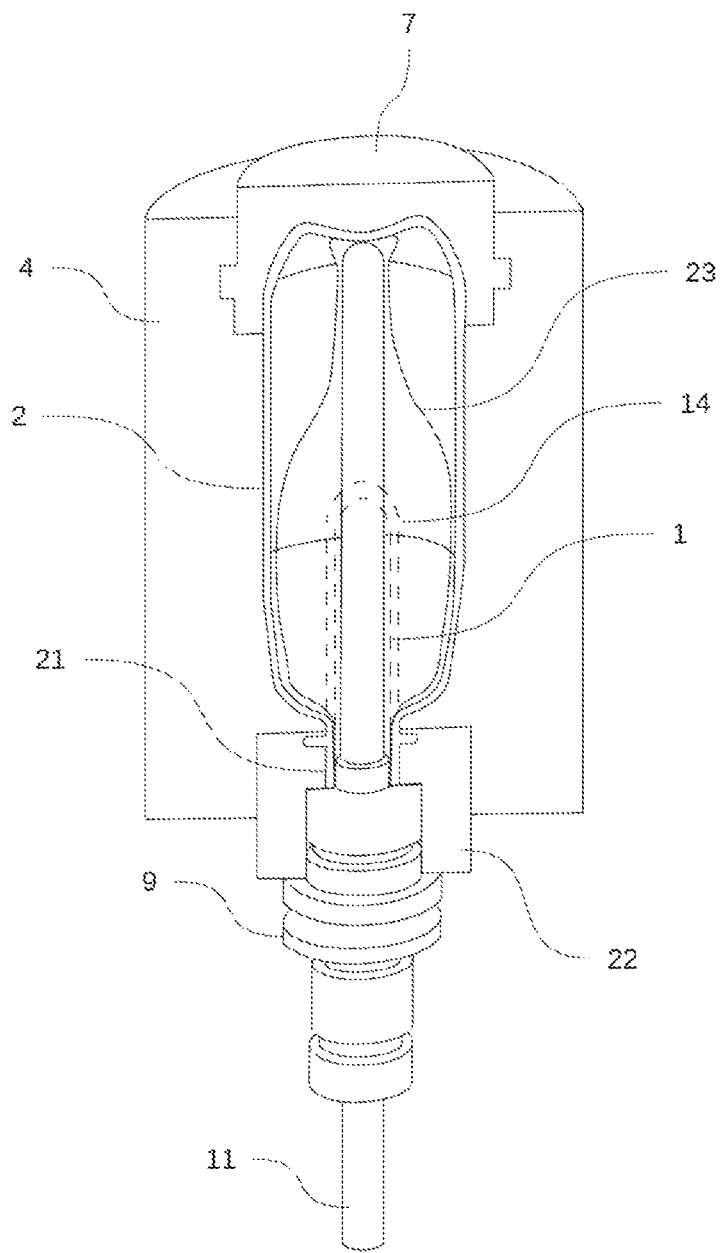
Figure 3:
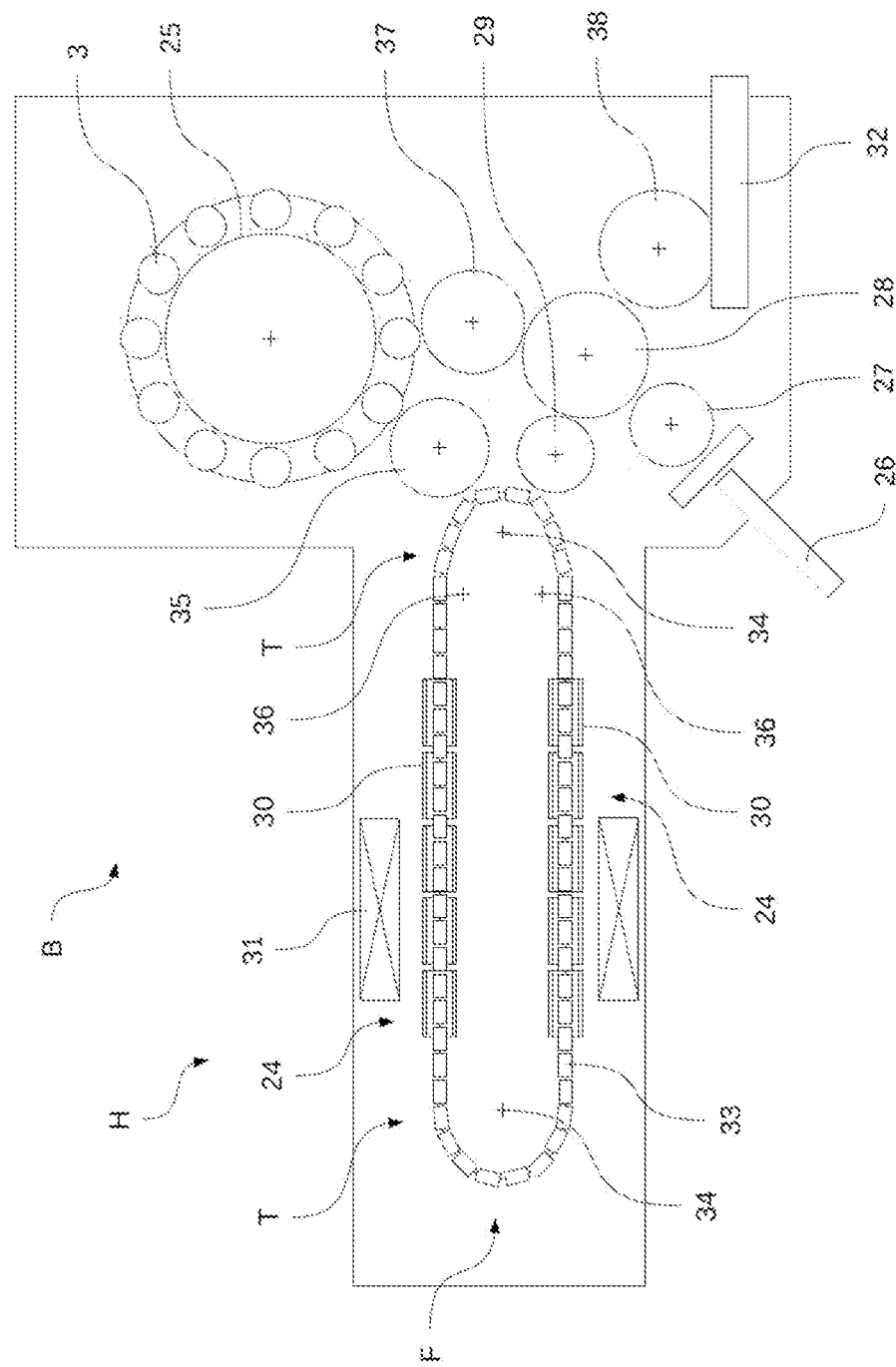
Figure 4:
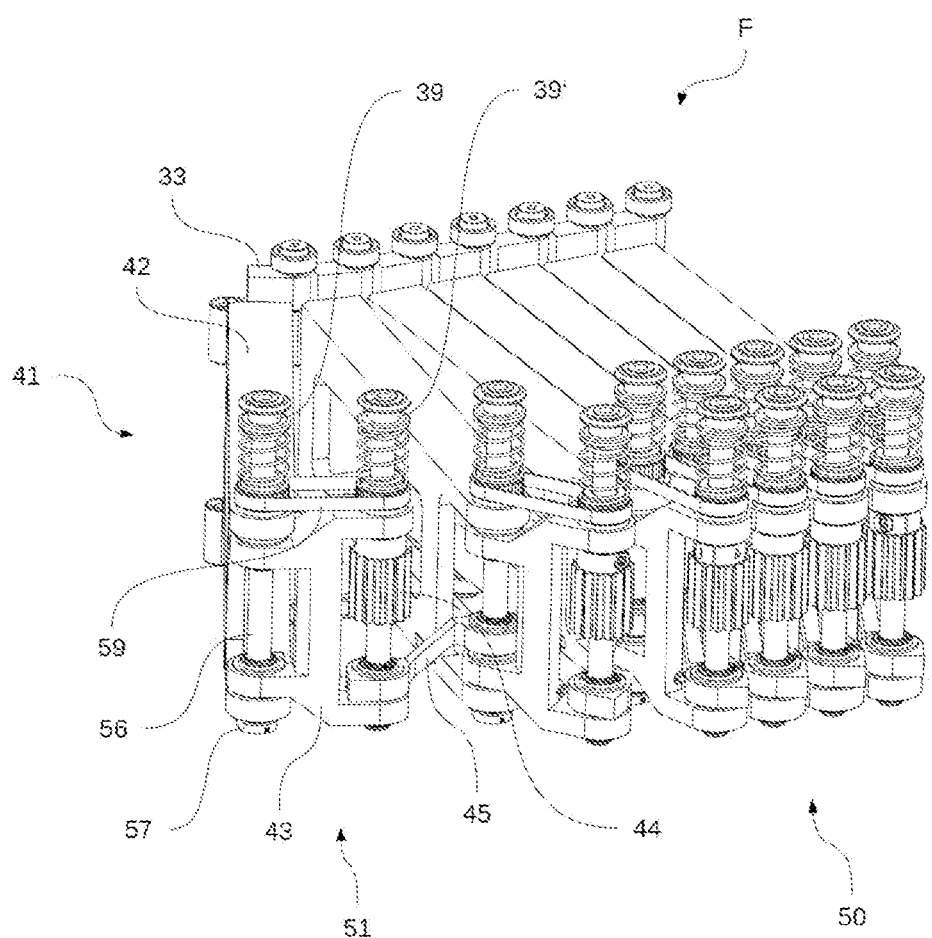
Figure 5:
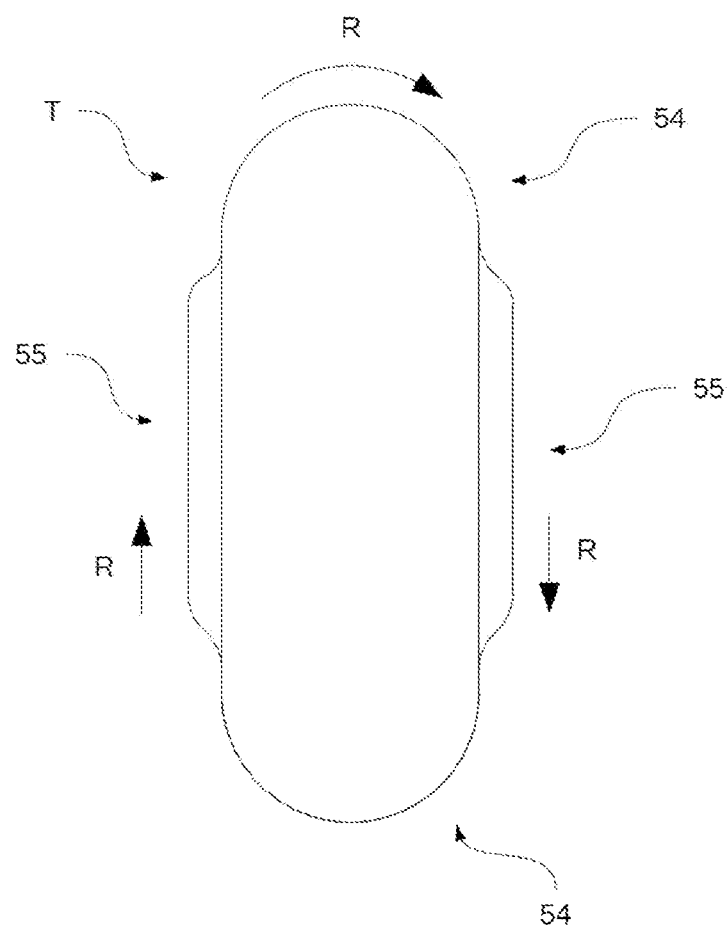
Figure 6:
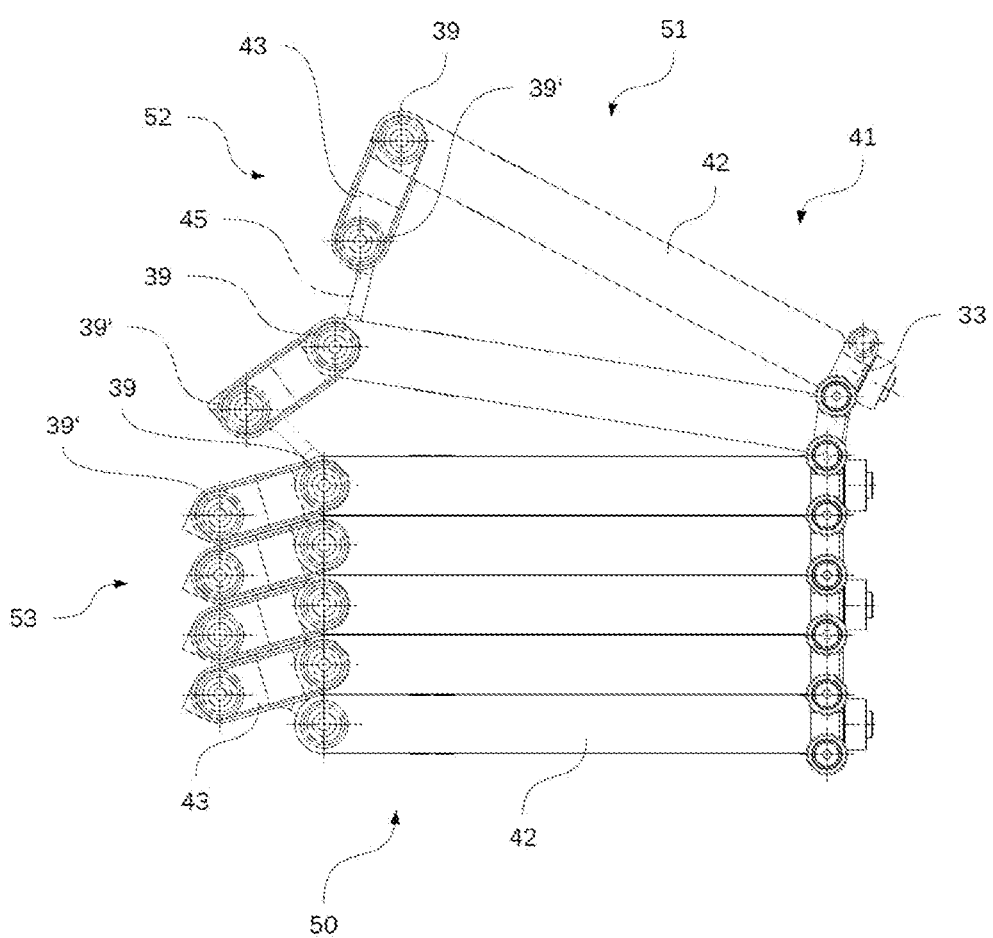
Figure 7:
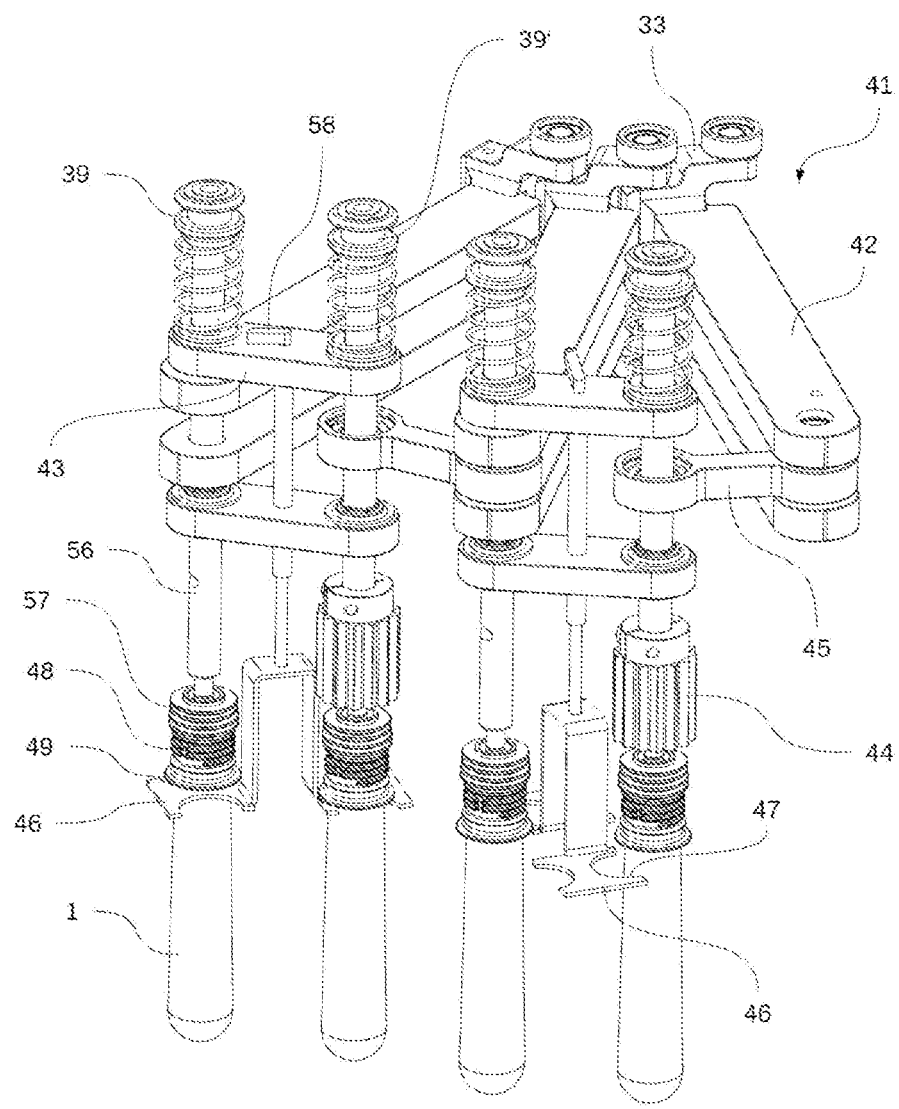

Exemplary embodiments and details of the invention are explained in greater detail in the following, with reference to the figures. The invention is illustrated in the figures, in some cases highly schematically. The figures show:

FIG. 1 a perspective view of a blow mold station for producing containers from preforms, FIG. 2 a longitudinal section of a blow mold in which a preform is stretched and expanded, FIG. 3 a diagram illustrating the basic configuration of an apparatus for blow molding preforms into containers, with an adjoining heating apparatus for the thermal conditioning of the preforms, FIG. 4 a segment of a conveyor chain according to the invention, from a perspective view, FIG. 5 an example of a line routes for the transport of the preforms along a transport path of a heating apparatus, FIG. 6 a segment of a conveyor chain according to the invention from a plan view, and FIG. 7 a segment of a conveyor chain according to the invention from a perspective view, with preforms held on handling means.

The basic structure of an apparatus for shaping preforms 1 into containers 2 is shown in FIG. 1 and in FIG. 2. Said apparatus may be disposed as shown or rotated 180° in a vertical plane.

The apparatus for forming container 2 consists substantially of a blow mold station 3, which is equipped with a blow mold 4 into which a preform 1 can be inserted. Preform 1 can be an injection-molded part made of polyethylene terephthalate. To allow preform 1 to be inserted into blow mold 4, and to allow finished container 2 to be removed, blow mold 4 is composed of mold halves 5, 6 and a bottom piece 7 that can be positioned using a lifting apparatus 8. Preform 1 can be fixed in the area of blow mold station 3 by a retaining element 9. This retaining element 9 may be configured according to the invention, for example, or as is known in the prior art. Preform 1 can be inserted directly into blow mold 4 using tongs or other handling means, for example. To enable a supply of compressed air, a connecting piston 10 is arranged below blow mold 4 and feeds compressed air to preform 1 while at the same time producing a seal. In a modified configuration, however, it is also possible to use fixed compressed air lines.

In this exemplary embodiment, preform 1 is stretched by means of a stretching rod 11, which is positioned by means of a cylinder 12. According to an alternative embodiment, stretching rod 11 is positioned by mechanical means using cam segments that are acted on by follower rollers. The use of cam segments is expedient particularly when a plurality of blow mold stations 3 are arranged on one rotating blow wheel 25.

In the embodiment shown in FIG. 1, the stretching system is configured to provide a tandem arrangement of two cylinders 12. Before the start of the actual stretching process, stretching rod 11 is moved by a primary cylinder 13 into the area of the bottom 14 of preform 1. During the actual stretching process, primary cylinder 13 is positioned, with the stretching rod extended, together with a carriage 15 that supports primary cylinder 13, by a secondary cylinder 16 or via a cam control mechanism. In particular, it is provided for secondary cylinder 16 to be cam-controlled such that a current stretching position is determined by a guide roller 17, which slides along a cam track during the stretching process. Guide roller 17 is pressed against the guide track by secondary cylinder 16. Carriage 15 slides along two guide elements 18.

Once the mold halves 5, 6, which are located in the area of supports 19, 20, have been closed, the supports 19, 20 are locked relative to one another by means of a locking device 40. To adjust to different shapes of a mouth section 21 of preform 1, the use of separate threaded inserts 22 in the area of blow mold 4 is provided, as shown in FIG. 2.

In addition to the blow molded container 2, FIG. 2 also shows preform 1, indicated by dashed lines, and the schematic outline of a developing container bubble 23.

FIG. 3 shows the basic configuration of a blow-molding machine that is equipped with a heating line 24 and a rotating blow wheel 25. Beginning from a preform input 26, preforms 1 are transported by transfer wheels 27, 28, 29 into the area of heating line 24. Radiant heaters 30 as heating devices, along with blowers 31 are provided along heating line 24, for temperature-treating the preforms 1. Once the preforms 1 have been sufficiently temperature treated, they are transferred by a transfer wheel 35 to blow wheel 25, where the blow mold stations 3 are located. The finished blow-molded containers 2 are fed by additional transfer wheels 37, 28, 38 to an output line 32. Transfer wheel 37 is embodied as a removal wheel, and transfer wheel 38 is embodied as a release wheel.

In order to shape a preform 1 into a container 2 so as to give container 2 material properties that will ensure a long shelf life of foodstuffs, especially beverages, that are filled into the container 2, special process steps must be adhered to in the heating and orientation of the preforms 1. Advantageous effects can further be achieved by adhering to special dimensioning guidelines. A variety of plastics may be used as the thermoplastic material. Examples of plastics that may be used include PET (polyethylene terephthalate), PEN (polyethylene naphthalate) and PP (polypropylene).

The expansion of preform 1 during the orientation process is accomplished by an infeed of compressed air. The infeed of compressed air is divided into a pre-blow-molding phase, in which gas, for example compressed air, is introduced at a low pressure level, and a subsequent main blow-molding phase, in which gas is introduced at a higher pressure level. Typically, compressed air at a pressure ranging from 10 bar to 25 bar is used during the pre-blow-molding phase, and compressed air at a pressure ranging from 25 bar to 40 bar is introduced during the main blow-molding phase.

As is likewise clear from FIG. 3, in the embodiment shown, heating line 24 is part of the transport path of the preforms 1. In heating apparatus H, preforms 1 are transported by means of a plurality of revolving transport elements 33, which are arranged in a row in a chain-like manner and are guided along turning wheels 34, 36. The revolving transport elements 33 therefore move along a chain path 55, which also forms the transport path of the preforms, since preforms 1 are guided along chain path 55. In particular, the chain-like arrangement of transport elements 33 is intended to span a substantially rectangular footprint. In the embodiment shown, in the area of the end of heating line 24 that faces transfer wheel 27, a single turning wheel 34 with relatively large dimensions is used, and in the adjacent turning areas, two deflecting wheels 36 with relatively smaller dimensions are used. In principle, however, any other desired guidance mechanisms are also conceivable.

The arrangement shown has proven particularly advantageous in terms of enabling the closest possible positioning of transfer wheel 27 and blow wheel 25 relative to one another, since three turning wheels 34, 36 are positioned in the area of the corresponding end of transport path 55, more specifically, the smaller turning wheels 36 are positioned in the area of transition to the linear profiles of the transport path 55 and the larger turning wheel 34 is positioned in the immediate transfer area to transfer wheel 27 and blow wheel 25. As an alternative to using chain-like transport elements 33, it is also possible to use a rotating heating wheel, for example.

Once the blow molding of containers 2 is completed, they are guided out of the area of blow mold stations 3 by transfer wheel 38 and are transported to output line 32.

Preforms 1 and containers 2 can be transported through blow-molding machine B in various ways. According to one variant, the preforms are carried at least along the majority of their transport path by transport mandrels. It is also possible, however, for the preforms to be transported by means of tongs, which grip the preform on the outside, or for inner mandrels to be used, which are inserted into the mouth area of a preform. Different variants with regard to the spatial orientation of the preforms are likewise conceivable.

According to one variant, the preform is infed in the area of preform input 26 with its mouth oriented upward in the vertical direction, is then rotated and conveyed along heating line 24 and blow wheel 25 with its mouth oriented downward in the vertical direction, and is then rotated again before reaching output line 32. According to another variant, preform 2 is heated in the area of heating line 24 with its mouth oriented downward in the vertical direction, but is rotated 180° again before reaching blow wheel 25.

According to a third variant, the preform passes through the entire area of blow-molding machine B with its mouth oriented upward in the vertical direction, without carrying out any such rotations. FIG. 4 shows a perspective view of part of a conveyor chain F according to the invention. Shown are a plurality of transport elements 33 embodied as chain links, which support preforms 1 on handling means 39, 39' that are equipped with supporting mandrels. The transport elements 33 are connected pivotably to one another.

Chain links 33 support outwardly protruding brackets 41, which comprise a main arm 42 and a pivot arm 43 articulated to main arm 42. A first handling means 39 is arranged coaxially to the rotational axis of the pivot joint that connects main arm 42 to pivot arm 43. A second handling means 39' is arranged on pivot arm 43, spaced from the first handling means 39. As is clear from FIG. 4, the angular position of second handling means 39' relative to main arm 42 can be adjusted by pivoting the pivot arm 43. Due to the arrangement of the first handling means 39 coaxially to the rotational axis of the pivot joint that connects main arm 42 to pivot arm 43, the adjustment path of the second handling means 39' describes a circular arc about the first handling means 39 when pivot arm 43 is pivoted. The distance between the first handling means 39 and the second handling means 39' of a bracket 41 thus remains the same at every pivot position of pivot arm 43. It is also conceivable, however, for the first handling means 39 to be secured to main arm 42 at a distance from the rotational axis between main arm 42 and pivot arm 43, in which case both the angular position and the distance between the second handling means 39' and the first handling means 39' would change when pivot arm 43 is pivoted.

FIG. 4 shows conveyor chain F during the transition from rectilinear guidance to curved guidance. In the rectilinear guide area, the brackets 41 are located in a closed position 50, in which the main arms 42 of adjoining brackets 41 are moved to lie bearing against one another. In the curved turning area, the brackets 41 are pivoted from closed position 50 to a splayed position 51, in which the main arms 42 of adjoining brackets 41 are moved to a position spaced from one another.

In the closed position 50 of brackets 41, the handling means 39, 39' and the preforms (not shown) supported thereon are guided side by side in the transport direction and thus in two rows. In the splayed position 51, the handling means 39, 39' are guided one behind the other in the transport direction and thus in a single row.

According to the exemplary embodiment of FIG. 4, arranged on the second handling means 39' is a coupling element 44, with which the second handling means 39' can be set in rotation about its longitudinal axis, in cooperation with a rotary drive mechanism (not shown). In the present case, coupling element 44 is embodied as a ring gear, which can be brought into meshing engagement with a toothed chain (not shown), arranged stationary in the area of heating apparatus H, for the purpose of rotating handling means 39'. Handling means 39' and a preform 1 supported thereon can be set in rotation by a relative movement between the toothed chain and ring gear 44.

In the exemplary embodiment shown, it is provided that in the double-row guidance area, only the second handling means 39' of a bracket, located on the outside with respect to the revolution path of chain links 33, is actively driven by a rotary drive mechanism, and the rotational movement is transmitted to inner handling means 39 by means of a rotary coupling. For this purpose, second handling means 39', which includes coupling element 44, is coupled rotatably to the first handling means 39 of a bracket by means of a belt 59. A rotation of second handling means 39' induced by the rotary drive mechanism is thereby transmitted to first handling means 39. This arrangement can also be reversed, in which case the inner first handling means 39 is actively driven and transmits its rotational movement by means of a rotary coupling to the second outer handling means 39'.

FIG. 4 further shows a coupling rod 45, with which a pivot arm 43 of a first bracket 41 is pivotably connected to an adjoining bracket 41. During a transition of bracket 41 from the closed position 50 to the splayed position 51, coupling rod 45 forces the pivot arms 43 into a turned-in position 52. During the transition from a splayed position 51 to the closed position 50, coupling rod 45 forces the pivot arms 43 into a turned-out position 53.

When conveyor chain F is revolving, the brackets 41 are guided alternately into the closed position 50 and the splayed position 51, more specifically, the brackets assume the splayed position 51 in the turning areas of conveyor chain F and the closed position 50 in the areas in which conveyor chain F is guided in a straight line. During this process, depending on the drive concept of conveyor chain F, tensile and compressive forces can act alternately on coupling rod 45, and are transmitted to the pivot arms 43 or to the adjoining brackets 41.

FIG. 5 is a schematic diagram illustrating preform guidance along a transport path T of a heating apparatus H that results when a conveyor chain F according to the invention revolves. The direction of transport is indicated by arrows R. In areas marked 54, the preforms 1 are transported in a single row, and in areas marked 55, the preforms 1 are transported in a double row.

With the change between the closed position 50 in the rectilinear parts of the line and the splayed position 51 in the curved parts of the line, the preform guidance changes accordingly between a single-row transport 54 in the curves and a double-row transport 55 in the straight areas.

FIG. 6 shows the part of the conveyor chain F according to the invention from FIG. 4 in a plan view. As is clear from this figure, the part of conveyor chain F that is shown is located in a transition from rectilinear guidance to curved guidance. During curved guidance of the chain links 33, adjoining main arms 42 are located in a splayed position 51. During rectilinear guidance of chain links 33, adjoining main arms 42 are located in the closed position 50.

When brackets 41 are moved to a closed position 50, pivot arms 43 are located in a turned-out position 53, and when brackets 41 are moved to the splayed position 51, the pivot arms 43 are located in a turned-in position 52. During the transition from the turned-out position 53 to the turned-in position 52, pivot arms 43 are pivoted relative to main arms 42 in such a way that the handling means 39, 39' transition from double-row guidance to single-row guidance. The preforms 1 (not shown) supported on handling means 39, 39' are thereby transferred from single-row transport to double-row transport. Similarly, with a transition from splayed position 51 to closed position 50, the handling means 39, 39' are transferred from single-row guidance to double-row guidance.

Due to the closed-loop revolution of conveyor chain F, brackets 41 transition alternately between the splayed position 51 and the closed position 50 at the beginnings and the ends of the turning areas, in other words, during transitions between straight-line and curved line routes of the chain links 33.

As is clear from FIG. 6, the distances between preforms being guided one behind the other during double-row transport are particularly small, which offers a number of advantages. For example, the short distances ensure that the smallest possible amount of radiant energy, which is acting on the body of preform 1 below its supporting ring 49 as the preforms 1 are transported in the area of the radiant heaters 30 of heating line 24, is able to escape upward in the vertical direction through large gaps between the preforms 1.

As is also clear from FIG. 6, in the double-row transport area, a first transport row is formed by first handling means 39 guided one behind the other, and a second transport row is formed by second handling means 39' guided one behind the other. In the single-row transport area, first and second handling means 39 and 39' alternate in succession.

FIG. 7 likewise shows a segment of a conveyor chain F according to the invention, in a perspective view. The basic configuration of this conveyor chain F is similar to the configuration shown in FIG. 4. In the segment shown here, the chain links 33 are located in a curved guidance area, hence the brackets 41 are in the splayed position 51. Pivot arms 43 are located in the turned-in position 52, in which handling means 39 and 39' are guided in a single row. In the pivoted position of pivot arms 43 in this case, preforms 1, which are supported on the lower end of handling means 39, 39' in the vertical direction, are transported in a single row, one behind the other.

As in the exemplary embodiment according to FIG. 4, a coupling element 44 with which preforms 1 can be set in rotation about their longitudinal axis is positioned on the second handling means 39'. The transmission of rotation to the first handling means 39, which is also intended here, is not shown in this figure.

FIG. 7 further illustrates the usual configuration of handling means 39, 39' with a holding mandrel 56, mounted so as to be vertically displaceable, and having, at its lower end in the vertical direction, a holding head 57 for holding a preform 1.

As FIG. 7 further shows, radiation shields 46 can be provided, which partially surround the preforms 1, below a supporting ring 49 that is attached just below mouth area 48.

The radiation shields can be mounted rotatably on pivot arms 43 so that the radiation shields can be removed from the preforms 1 laterally. The radiation shields 46 can be rotationally positioned, for example, by actuating a shield lever 58, which is arranged rotationally fixed on the rotary shaft of radiation shields 46. Shield levers 58 are guided, for example, by a guide rail (not shown) which is arranged fixedly on heating apparatus H. The radiation shields 41, which block vertical passage between two preforms 1 that are being transported one behind the other in a single row when brackets 41 are in the closed position, can thereby be rotated, collision-free, out of engagement around the preforms 1 during the transition of pivot arms 43 from the turned-out position 53 to the turned-in position.

As is shown, radiation shields 46 can be embodied as plate-like and can each have two concave recesses 47, formed in the material of radiation shield 46 on opposite sides. In the double-row transport area of preforms 1, two radiation shields 46 of two pivot arms 43 are joined in such a way that the recesses 47 of these two joined radiation shields 41 lie opposite one another and together form an approximately circular cutout, which leaves a passage open for the body of a preform 1.

Each of the recesses 47 of radiation shields 46 engages at least partially around a preform 1, preferably below its supporting ring 49, over an angular range of 180°, for example. Recesses 47 are preferably configured such that the radiation shields 46 overlap supporting ring 49 in the longitudinal direction of preform 1. In this way, the intermediate spaces between the preforms 1 are closed off particularly effectively. Moreover, any undesirable heating of the supporting rings 49 and of the mouth sections 48 thereabove can also be diminished during transport through the heating line 24.

| List of Reference Signs | |
|---|---|
| 1 | preform |
| 2 | container |
| 3 | blow mold station |
| 4 | blow mold |
| 5 | first mold half |
| 6 | second mold half |
| 7 | bottom part |
| 8 | lifting apparatus |
| 9 | holding element |
| 10 | connecting piston |
| 11 | stretching rod |
| 12 | cylinder |
| 13 | primary cylinder |
| 14 | bottom |
| 15 | carriage |
| 16 | secondary cylinder |
| 17 | guide roller |
| 18 | guide element |
| 19 | first support |
| 20 | second support |
| 21 | mouth section |
| 22 | threaded insert |
| 23 | container bubble |
| 24 | heating line |
| 25 | blow wheel |
| 26 | preform input |
| 27 | transfer wheel |
| 28 | transfer wheel |
| 29 | transfer wheel |
| 30 | radiant heater |
| 31 | blower |
| 32 | output line |
| 33 | transport means |
| 34 | turning wheel |
| 35 | transfer wheel |
| 36 | turning wheel |
| 37 | transfer wheel |
| 38 | transfer wheel |
| 39 | first handling means |
| 39 | second handling means |
| 40 | locking device |
| 41 | bracket |
| 42 | main arm |
| 43 | pivot arm |
| 44 | coupling element |
| 45 | coupling rod |
| 46 | radiation shield |
| 47 | recess of radiation shield |
| 48 | mouth section |
| 49 | supporting ring |
| 50 | closed position |
| 51 | splayed position |
| 52 | turned-in position |
| 53 | turned-out position |
| 54 | single-row transport area |
| 55 | double-row transport area |
| 56 | holding mandrel |
| 57 | holding head |
| 58 | shield lever |
| 59 | belt |
| B | blow mold station |
| H | heating apparatus |
| T | transport path |
| F | conveyor chain |
| R | direction of transport |

The invention claimed is:

1. A heating apparatus having at least one heating line for thermally conditioning preforms made of thermoplastic material to a temperature profile suitable for blow molding, wherein the heating apparatus comprises a transport device for transporting the preforms along a transport path of the heating apparatus, wherein the transport device comprises a revolving conveyor chain having a plurality of pivotably interconnected chain links wherein the transport device comprises a first handling means and a second handling means, wherein the first handling means and the second handling means are each configured to hold and manipulate a single preform wherein the transport device is configured such that the preforms are guided in a single row in at least a first section of the transport path and are guided in two adjacent rows in at least a second section of the transport path, wherein each of the pivotably interconnected chain links comprises a bracket on which the first handling means and the second handling means are arranged, and wherein the bracket comprises a main arm and a pivot arm that is pivotably connected to the main arm such that a change between guidance of the preforms in the single row in at least the first section of the transport path and guidance of the preforms in the two adjacent rows in at least a second section of the transport path is effectuatable by pivoting the pivot arm.

2. The heating apparatus according to claim 1, wherein the first handling means is arranged on the bracket coaxially to a rotational axis of a pivot joint that connects the main arm to the pivot arm.

3. The heating apparatus according to claim 1, wherein at least one of the first handling means and the second handling means comprises a coupling element for rotation of a preform that is held by said at least one of the first handling means and the second handling means, and wherein in an area of the at least one heating line, a rotary drive mechanism is provided that cooperates with the coupling element.

4. The heating apparatus according to claim 3, wherein said at least one of the first handling means and the second handling means that includes the coupling element is movably coupled to another of said at least one of the first handling means and the second handling means arranged on the same bracket such that a rotation of the second handling means induced by means of the rotary drive mechanism is transmitted to the first handling means and a rotation of the first handling means induced by means of the rotary drive mechanism is transmitted to the second handling means.

5. The heating apparatus according to claim 1, wherein the transport device further comprises guide means for controlling guidance of the pivot arm.

6. The heating apparatus according to claim 5, wherein the guide means comprise a guide rail arranged fixedly in an area of the heating apparatus and guide elements arranged on the bracket that cooperate with the guide rail as the conveyor chain revolves.

7. The heating apparatus according to claims 5, wherein the guide means comprises a coupling rod which is pivotably connected to each pivot arm and is mounted pivotably on the main arm arranged on an adjacent bracket in a direction of revolution of the conveyor chain.

8. The heating apparatus according to claim 7, wherein the guide means is configured such that an over dead center position of a connection formed by the pivot arm and the coupling rod is prevented.

9. The heating apparatus according to claim 1, wherein the transport device further comprises radiation shields, which are supported by the conveyor chain such that the radiation shields are brought into position between the first handling means and the second handling means in at least the heating line within the second section of the transport path.

10. A blow-molding machine comprising a heating apparatus according to claim 1, and a blow-molding apparatus for biaxial blow molding of preforms into containers.

\* \* \* \* \*